United States Patent [19]

Ozawa

[11] Patent Number: 4,495,523
[45] Date of Patent: Jan. 22, 1985

[54] SIGNAL PROCESSING UNIT FOR ORIGINAL READING DEVICE

[75] Inventor: Takashi Ozawa, Kanagawa, Japan

[73] Assignee: Fuji Xerox Co., Ltd., Tokyo, Japan

[21] Appl. No.: 459,556

[22] Filed: Jan. 20, 1983

[30] Foreign Application Priority Data

Jan. 22, 1982 [JP] Japan .................... 57-7456

[51] Int. Cl.³ .................. H04N 1/10; H04N 3/14; H04N 5/21
[52] U.S. Cl. .................... 358/293; 358/213; 358/167; 357/24
[58] Field of Search ............. 358/166, 167, 284, 293, 358/294, 212, 213; 357/24 LR

[56] References Cited

U.S. PATENT DOCUMENTS

| 4,045,817 | 8/1977 | Dakatami et al. | 358/213 |
| 4,109,284 | 8/1978 | Tompkins | 358/212 |
| 4,145,721 | 3/1979 | Beaudouin et al. | 358/213 |
| 4,335,405 | 6/1982 | Sakame et al. | 358/213 |
| 4,419,696 | 12/1983 | Hamano et al. | 358/293 |
| 4,424,590 | 1/1984 | Ozawa | 358/293 |
| 4,449,147 | 5/1984 | Ogasawara | 358/293 |

Primary Examiner—Michael A. Masinick
Assistant Examiner—John K. Peng
Attorney, Agent, or Firm—Sughrue, Mion, Zinn, Macpeak & Seas

[57] ABSTRACT

A signal processing circuit for an original reading device substantially eliminates noise from a photosignal output. Light sensing elements are connected to one of two signal lines on an alternating group basis, two or more elements per group, via MOS switching transistors. Each element is accessed twice during each cycle by switching its associated MOS twice. The noise-only signal resulting from the second switching is subtracted from the photosignal plus noise resulting from the first switching by applying the signal lines to a differential amplifier. The output signal containing reduced nose is periodically inverted to compensate for inversion of one signal line in the differential amplifier and is then subjected to integration to remove the remaining noise.

5 Claims, 6 Drawing Figures

SIGNAL PROCESSING UNIT FOR ORIGINAL READING DEVICE

FIELD OF THE INVENTION

The present invention relates to an original reading device for use in a facsimile system and other optical eqipment. More particularly, the invention relates to a signal processing circuit for a large-scale image sensor that has recently been developed as a replacement for an MOS photodiode array or CCD image sensor currently used in original reading devices.

BACKGROUND OF THE INVENTION

An original reading device (hereunder referred to as a large-scale image sensor) comprises an insulating substrate, a plurality of photoelectric transducers formed on the substrate, and a circuit for switching and scanning the transducers that is either formed on the substrate or attached to another substrate. The length of the transducer array is equal to the size of the original. The sensor uses an optical fiber array or lens array to read the original and thus the length of optical path for image forming can be decreased to reduce the scale of the reading device by a considerable degree.

An equivalent circuit of a conventional large-scale image sensor and its construction are shown in FIGS. 1(a) and 1(b), and a cross-section of FIG. 1(b) taken on the line A—A' is shown in FIG. 1(c). A light receiving element generally indicated at 5 comprises a substrate 1 supporting a thin photoconductive film 3 sandwiched between discrete electrodes 2 made of a thin conductive film and a continuous electrode 4 made of a thin transparent conductive film. An equivalent circuit of the light receiving element consists of a photodiode PD and a capacitor CD.

A shift register 8 turns on MOS transistors $7_1$ to $7_n$ sequentially and a bias supply 10 charges the light receiving elements 5 to a maximum amount. In the reading cycle, the charge accumulated in the capacitor CD is discharged by the photodiode PD depending on the quantity of light falling on the element 5. Then, the shift register 8 turns on the MOS transistors sequentially to recharge the capacitors CD. The recharging current produced is transmitted over a signal line 12 and picked up as a photo-signal by a load resistor 9. In short, a recharging current flows in the area where discharging has occurred upon illumination, and no recharging current flows in the black area where no discharging has taken place. This is the general operating theory of the reading of the original by the light receiving element.

The light receiving element 5 used in the conventional large-scale image sensor is made of a thin film material, so it can be formed on the insulating substrate 1 in one step by vapor deposition, sputtering or chemical vapor deposition (CVD). The MOS transistors $7_1$ to $7_n$ and shift register 8 are usually made of a crystalline material and cannot be formed integrally with the element 5. Instead, the MOS transistors and shift register are packed in an integrated switching circuit 6 which is mounted on the substrate 1 or another substrate and connected to the element 5 by wire bonding 11 or other suitable means. The length of the switching circuit 6 is substantially the same as that of the array of light receiving elements 5. This requires a very long signal line 12 which is subject to induced noise. Typical noises are clock noise accompanying the driving of the shift register 8 and spike noise that enters from the gates of the MOS transistors 7. These noises reduce the S/N ratio of the output signal from the large-scale image sensor and reduce the operating speed of the image sensor and the power consumption of the illuminating light source.

An original reading device that minimizes the induced noise and achieves high S/N ratio is disclosed in a Japanese patent application filed by applicant herein on Nov. 13, 1981. The image sensor of the latter application comprises a plurality of reading devices each consisting of a reading element and a circuit for driving it, wherein two signal lines are provided for connection to the MOS transistors, two or more adjacent MOS transistors being connected to the alternate signal lines, each MOS transistor being switched twice, once for producing a signal and a second time for producing noise, and the outputs from the respective signal lines are subjected to differential amplification.

A schematic representation of the invention of the above mentioned application is shown in FIG. 2, wherein the sources 13 of three MOS transistors 7 that make up a single chip of switching circuits 6 (indicated by the dashed line) are connected to alternate signal lines 12a and 12b. It is to be understood that at least two consecutive sources 13 are connected to the signal lines 12a and 12b, and that as many as several tens of sources may be connected.

The operational sequence of the image sensor of FIG. 2 is shown in the timing chart of FIG. 4. The clock indicated in FIG. 4 is used to drive the shift register 8. Signals a to i represent the timing of signals to be applied to the gates of MOS transistors 7a and 7i by the shift register 8; the transistors are turned on at level "L" and turned off at level "H". First, low-level signals a, b and c are consecutively supplied to produce pulses a-1, b-1 and c-1 that turn on the transistors 7a–7c sequentially. Since those transistors are connected to the signal line 12a, the signal j on line 12a is a mixture of photosignal and noise as indicated pulses by j-1, j-2 and j-3. The hatched area of pulse j-1 corresponds to the photo-signal, and the other area is noise. Subsequently, low-level signals d, e and f are consecutively supplied from the shift register 8 to produce pulses d-1, e-1 and f-1 that turn on MOS transistors 7d, 7e and 7f sequentially. Since these transistors are connected to the signal line 12b, the signal k on line 12b is a mixture of a photosignal and noise as indicated by pulses k-4, k-5 and k-6. The same procedure is repeated to turn on transistors 7g, 7h and 7i consecutively to produce signal j indicated by pulses j-7, j-8 and j-9 on the signal line 12a. Simultaneously with the second step, low-level signals a, b and c are supplied sequentially to produce pulses a-2, b-2 and c-2 that turn on the MOS transistors 7a, 7b and 7c again. In other words, the switching circuit operates as if it were a ring counter. Since the interval between switching by pulses a-1, b-1 and c-1 and that by pulses a-2, b-2 and c-2 is very brief, the quantity of photosignals accumulated in the light receiving elements 5 is negligible and signal pulses j-4, j-5 and j-6 on signal line 12a contain only noise. By repeating this procedure, signals as indicated by j and k containing both photosignal and noise and those containing only noise are alternately fed to the signal lines 12a and 12b. Signals j and k are subject to differential amplification in a differential amplifier 14, which is connected to the signal lines 12a and 12b, a signal 1 containing a minimum of nose is produced at the amplifier output 15. As shown, the signal 1 contains some inverted pulses from the signal line 12a, and this is because line 12a is connected to the inverting input of the amplifier 14. The signal 1 still contains some noise because the noise in signal j is not completely the same as that in signal k, and this difference is largely due to the fact that different noise originates from different MOS transistors.

RELATED APPLICATIONS

The subject matter described herein is related to the subject matter described in an application of the same assignee filed on the same date as this application and entitled, "Original Reading Device."

SUMMARY OF THE INVENTION

The primary object of the present invention is to provide a signal processing circuit for an original reading device that produces a substantially noiseless, high S/N ratio output.

The output signal containing both noise and photosignal is subjected to integration. Since the noise component contains positive and negative polarity whereas the photosignal component contains only a single polarity, the integration reduces the noise component and increases the photosignal component, thereby further improving the S/N ratio.

PREFERRED EMBODIMENT OF THE INVENTION

Figure 2:
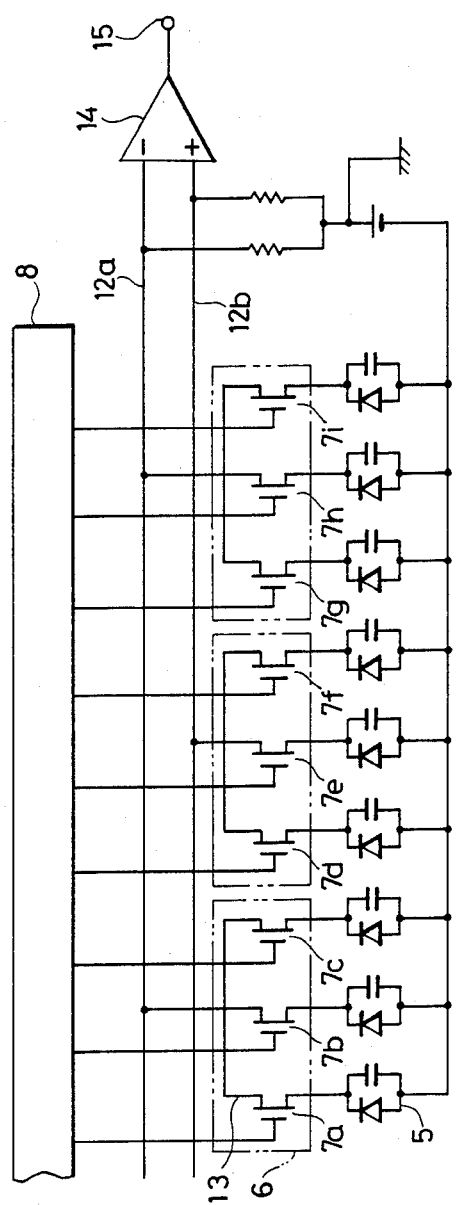
FIG. 2 is an equivalent circuit of the large-scale image sensor to which the signal processing circuit of the present invention is adapted.
Figure 3:
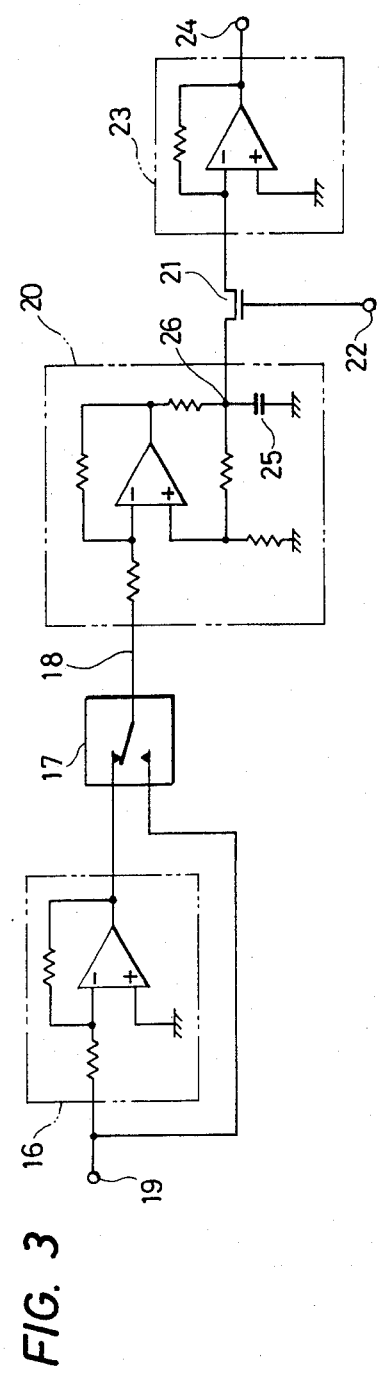
FIG. 3 is a circuit diagram of the signal processing circuit of the present invention.
Figure 4:
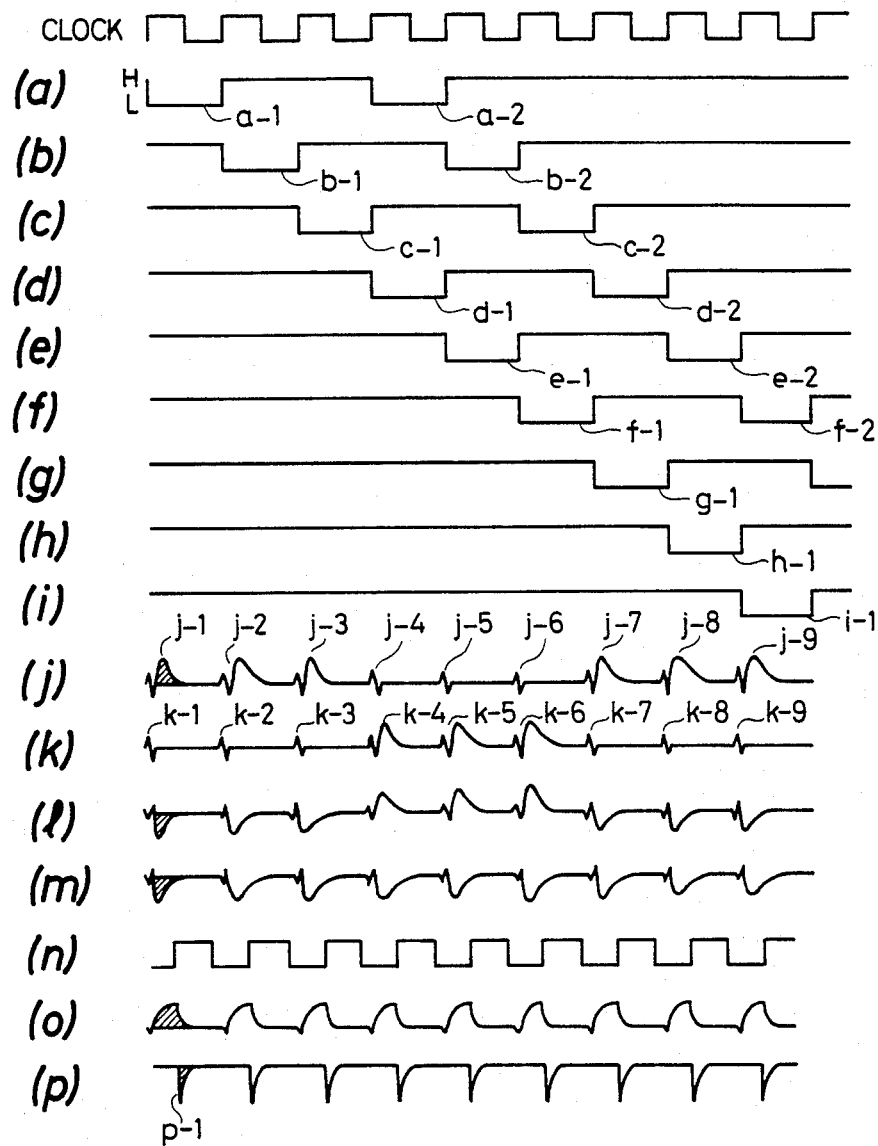
FIG. 4 is a timing chart showing the operating sequence of the signal processing circuit of the present invention.

The output signal on output terminal 15 from the circuit of FIG. 2 is delivered to an input 19 in FIG. 3. The signal is inverted in an inverting amplifier 16. An inverted signal and a noninverted signal are delivered to an output 18 at proper intervals by means of a switch 17. The signals at the input 18 have the same polarity as indicated by signal m in FIG. 4. These signals are integrated by an integrator 20 and the charge accumulated in a capacitor 25 is discharged by an MOS transistor 21 after a given interval. When pulses are applied to the gate 22 of the transistor 21 at timed intervals dictated by signal n, the potential at point 26 is indicated by signal o. Since signal m contains both negative and positive noise, they cancel each other as a result of integration, and the charge accumulated in the capacitor 25 correspond only to the photosignal. This is because the photo-signal always has a single polarity whereas the noise may have either positive or negative polarity. Therefore, if a current pulse generated by discharging the capacitor 25 in a very short period by the MOS transistor 21 is amplified by an amplifier 23, a substantially noiseless signal that contains only the photosignal as indicated by signal p is picked up at an output 24. In FIG. 4, the hatched area of pulse p-1 corresponds to the photosignal, and as shown, the signal picked up at the output 24 has a high S/N ratio.

Figure 1A:
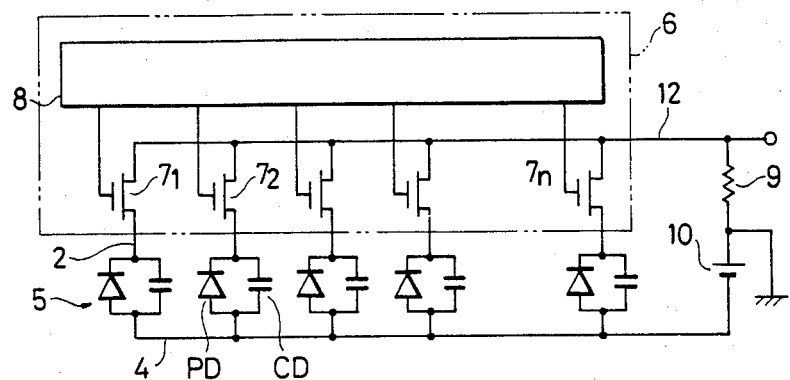
FIG. 1(a) is an equivalent circuit diagram of a conventional large-scale image sensor.
Figure 1B:
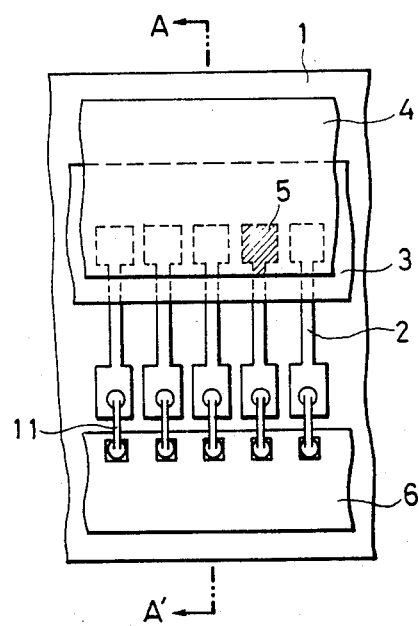
FIG. 1(b) is a top view of a structure of the image sensor of FIG. 1(a)
Figure 1C:
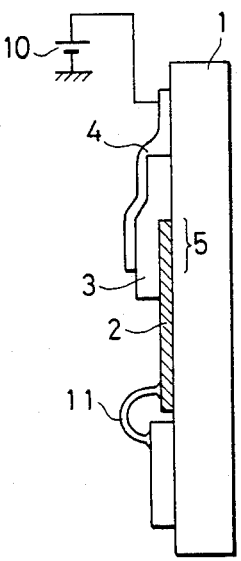
FIG. 1(c) is a cross-section of FIG. 1(b) taken on the line A—A'.

The amplifier 23 in FIG. 3 is an operational amplifier, but the same result can be obtained by any other circuit that is composed of discrete active and passive elements. An equally great improvement in the S/N ratio can be achieved if that part of the signal processing circuit consisting of integrator 20, MOS 21, and amplifier 23, is connected to receive the signal picked up by the load resistor 9 in FIG. 1. The high S/N ratio achieved by the signal processing circuit of the present invention will contribute greatly to meeting the requirements of low power consumption of the illuminating light source and high-speed reading of the original.

I claim:

1. A signal processing circuit for an original reading device of the type which charges and recharges light sensing elements via switching circuitry to develop output signals representative of the light illuminating said light sensing elements, said signal processing circuit comprising:
   integrating means for integrating said output signals, the integrating time constant being less than the period of said output signals; and
   operational amplifier means for amplifying the output of said integrating means.

2. An original reading device of the type having light sensing elements connected to a signal line through MOS transistors, whereby a light sensing element is charged when an MOS to which it is connected is turned on, the charging representing light intensity on said light sensing element and being detected on a signal line, said original reading device comprising:
   first and second signal lines for connection to said elements via a corresponding number of said MOS transistors to which said elements are respectively connected;
   said number of MOS transistors being arranged in alternating groups of at least two MOS transistors per group, said groups being alternately connected to said first and second signal lines such that all MOS transistors in any group are connected to the same signal line and all MOS transistors in the next succeeding group are connected to the other signal line; and
   a differential amplifier means, having its inputs fed with the signals on said first and second signal lines, for providing an output signal;
   means for integrating said output signal of said differential amplifier to remove noise in said output signal.

3. An original reading device as claimed in claim 2 further comprising, an inverter connected to receive the output of said differential amplifier, and a two input one output switch having one input connected to the output of said differential amplifier and a second input connected to the output of said inverter and its output connected to said integrating means, said switching means periodically switching between its two inputs to provide single polarity photosignals to said integrating means.

4. An original reading device as claimed in claim 3 wherein said integrator comprises a charging capacitor and a transistor for discharging said capacitor.

5. An original reading device as claimed in claim 4 further comprising an operational amplifier connected to the output of said integrating means.

* * * * *